United States Patent [19]
Tang et al.

[11] Patent Number: 6,022,401
[45] Date of Patent: *Feb. 8, 2000

[54] BIODEGRADABLE MODIFIED POLYASPARTIC POLYMERS FOR CORROSION AND SCALE CONTROL

[75] Inventors: Jiansheng Tang, Naperville, Ill.; Shi-Liang Fu, Richmond; Daniel H. Emmons, Rosenberg, both of Tex.

[73] Assignee: Nalco Chemical Company, Naperville, Ill.

[ * ] Notice: This patent is subject to a terminal disclaimer.

[21] Appl. No.: 09/061,942

[22] Filed: Apr. 17, 1998

Related U.S. Application Data

[63] Continuation-in-part of application No. 08/683,001, Jul. 16, 1996, Pat. No. 5,776,875, and a continuation-in-part of application No. 08/686,616, Jul. 19, 1996, Pat. No. 5,750,070, and a continuation-in-part of application No. 08/722,401, Sep. 30, 1996, Pat. No. 5,929,198, and a continuation-in-part of application No. 08/717,374, Sep. 20, 1996, Pat. No. 5,876,623.

[51] Int. Cl.[7] .............................. C23F 11/00; C23F 11/12; C23F 11/14
[52] U.S. Cl. ................................. 106/18.32; 106/18.31; 210/698; 252/180; 252/389.1; 252/389.22; 252/389.23; 252/389.61; 252/389.62; 252/390; 252/392; 252/394; 252/396; 422/16; 422/17
[58] Field of Search ............................. 106/18.32, 18.31; 252/180, 389.1, 389.22, 389.23, 389.61, 389.62, 390, 392, 394, 396; 422/16, 17, 15, 7; 210/698

[56] References Cited

U.S. PATENT DOCUMENTS

| | | | |
|---|---|---|---|
| 5,357,004 | 10/1994 | Calton et al. | 525/435 |
| 5,457,176 | 10/1995 | Adler et al. | 528/328 |
| 5,478,919 | 12/1995 | Koskan et al. | 528/363 |
| 5,525,257 | 6/1996 | Kleinstuck et al. | 252/181 |
| 5,610,255 | 3/1997 | Groth et al. | 526/304 |
| 5,750,070 | 5/1998 | Tang et al. | 422/16 |
| 5,776,875 | 7/1998 | Tang et al. | 510/247 |

OTHER PUBLICATIONS

Chemical Abstract No. 122:32370, abstract of German Patent Specification No. 4244031, Jun. 1994.

Chemical Abstract No. 128:184485, abstract of European Patent Specification No. 823402, Jul. 1997.

WPIDS Abstract No. 97–000403, abstract of German Patent Specification No. 19518421, Nov. 1996.

*Primary Examiner*—Anthony J. Green
*Attorney, Agent, or Firm*—Hill & Simpson

[57] ABSTRACT

Several copolymers of aspartic acid and another monomer provide effective mild steel corrosion inhibitors and scale formation inhibitors under oil field conditions. The copolymers are polymers of modified polyaspartic acid mer units and polyaspartic acid mer units. The resulting polymers are biodegradable.

23 Claims, 3 Drawing Sheets

6,022,401

BIODEGRADABLE MODIFIED POLYASPARTIC POLYMERS FOR CORROSION AND SCALE CONTROL

CROSS-REFERENCE TO RELATED APPLICATIONS

This application is a continuation-in-part of commonly-assigned and application Ser. Nos. 08/683,001, filed Jul. 16, 1996, now U.S. Pat. No. 5,776,875, and a CIP 08/686,616, filed Jul. 19, 1996, now U.S. Pat. No. 5,750,070 and Ser. No. 08/722,401, filed Sep. 30, 1996, now U.S. Pat. No. 5,929,198 and Ser. No. 08/717,374, filed Sep. 20, 1996 now U.S. Pat. No. 5,876,623.

BACKGROUND OF THE INVENTION

The present invention relates generally to a new family of biodegradable, environmentally friendly poly(aspartic acid) polymers and copolymers. More specifically, the present invention relates to modified poly(aspartic acid) polymers useful in water treatment applications for corrosion and scale control.

Poly(amino acids) are generally known in the art of corrosion and scale control. One commonly used poly(amino acid) is poly(aspartic acid). Poly(aspartic acid) is known to be biodegradable. The biodegradability and environmentally friendly nature of polyaspartic acid is important, particularly in the offshore oil and gas industry due to the increased international concerns over marine pollution and the increased restrictions imposed on offshore oil and gas rigs relating to chemical discharges. In the future, it is anticipated that the chemicals discharged from oil and gas rigs will be evaluated under a standardized system using the Organisation for Economic Co-operation and Development (OECD) guidelines. These guidelines are published and currently available.

While it is known that poly(aspartic acid) is biodegradable under the OECD guidelines, many modified poly(amino acids) and modified polyaspartic acids are not biodegradable. Further, while poly(aspartic acid) is somewhat effective at corrosion inhibition and scale control, poly(aspartic acid) is not a universal solution to corrosion inhibition and scale control on metallic surfaces of industrial water systems and in oil field environments. Specifically, one known product that includes imidazolium and an additive is known to be a superior corrosion inhibitor in stirred kettle tests simulating oil field conditions. However, imidazolium compounds are not biodegradable.

Accordingly, there is a need for an improved compound for reducing corrosion and inhibiting scale formation on metallic surfaces in industrial water systems and on metallic surfaces in an oil field environment. Any such compound must be environmentally friendly or deemed biodegradable under OECD guidelines.

SUMMARY OF THE INVENTION

The present invention satisfies the aforenoted need by providing an improved, biodegradable corrosion inhibitor and anti-scalant for addition to oil field fluid systems and other industrial water systems. The corrosion inhibitor and anti-scalant of the present invention includes a modified poly(aspartic acid) polymer that comprises aspartic acid mer units and modified aspartic acid mer units. The modified aspartic acid mer units have sidechains selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

In an embodiment, the composition of the present invention is biodegradable.

In an embodiment, the aspartic acid mer units have the formula

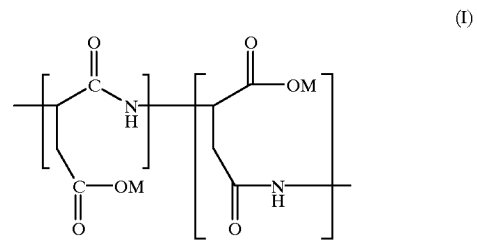

(I)

wherein M is a cation selected from the group consisting of hydrogen, an alkali metal, an alkaline earth metal, ammonium and alkyl-substituted ammonium cations.

In an embodiment, the modified aspartic acid mer units have the formula

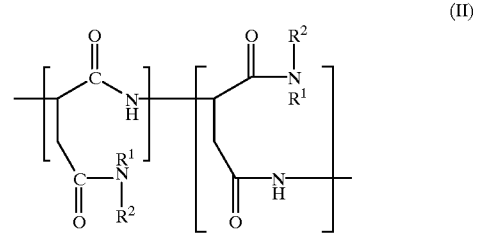

(II)

wherein $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

In an embodiment, the composition of the present invention has a molecular weight ranging from about 1000 to about 200,000.

In an embodiment, the composition of the present invention has the formula (III)

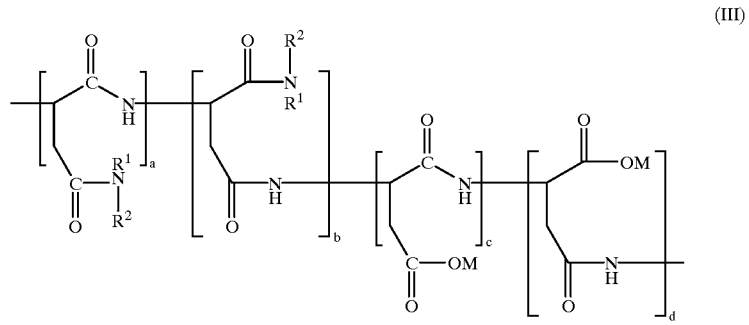

wherein M is a cation selected from the group consisting of hydrogen, an alkali metal, an alkali earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion; and wherein (a+b)/(c+d) ranges from about 0.05 to about 4.

In an embodiment, the ratio (a+b)/(c+d) is 0.05 to 0.80, preferably 0.05 to 0.50, more preferably 0.05 to 0.30.

In an embodiment, $R^2$ is ethanol.

In an embodiment, $R^2$ is ethoxyethanol.

In an embodiment, $R^2$ is methoxypropyl.

In an embodiment, $R^2$ is OH.

In an embodiment, $R^2$ is ethylaminoethanol.

In an embodiment, the present invention comprises a biodegradable composition for reducing corrosion and inhibiting scale formation on metallic surfaces of oil field equipment. The composition comprises a modified poly(aspartic acid) polymer having the formula Still another advantage of the present invention is that a new family of biodegradable modified poly(aspartic acid) polymers are provided for reducing corrosion and scale-formation in oil field equipment and that will satisfy OECD ecotoxicology guidelines.

Other objects and advantages of the present invention will be apparent upon a review of the following detailed description of the invention and working examples.

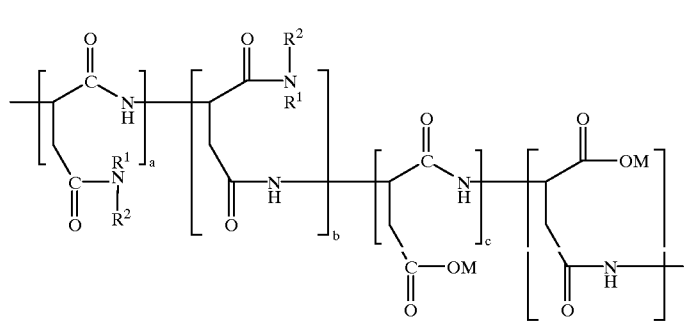

(III)

Figure 1:
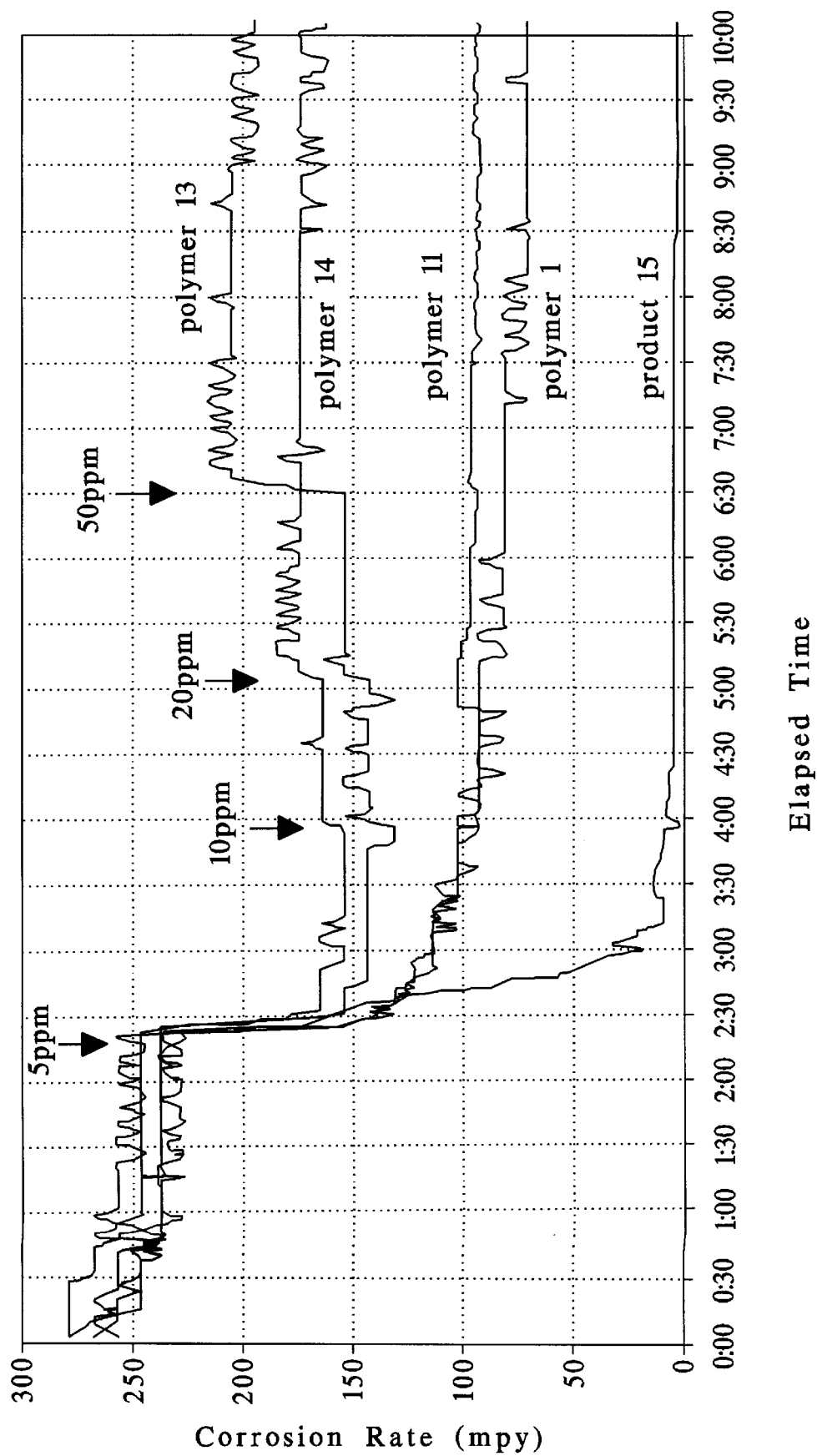
FIG. 1 illustrates, graphically, the reduced corrosion rate provided by polymers made in accordance with the present invention as opposed to polyaspartic acid polymers.

wherein M is a cation selected from the group consisting of hydrogen, an alkali metal, an alkaline earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion; and wherein (a+b)/(c+d) ranges from about 0.05 to about 4.

In an embodiment, $R^2$ is ethanolamine and the ratio (a+b)/(c+d) is 0.05 to 0.80, preferably 0.05 to 0.50, more preferably 0.05 to 0.30.

In an embodiment, the present invention provides a method for reducing corrosion and inhibiting scale formation in a system for circulating fluid in an oil or gas well, the method comprises the steps of adding a composition to the fluid being circulated in the system. The composition comprises a modified poly(aspartic acid) polymer of the formula disclosed above.

In an embodiment, the composition of the present invention is added to the system in an amount so that a concentration of the composition in the fluid exceeds 1 ppm.

In an embodiment, the concentration of the composition in the system is less than 10 ppm.

An advantage of the present invention is that a new family of biodegradable functionalized poly(aspartic acid) polymers are provided for corrosion inhibition and scale-formation control.

Another advantage of the present invention is that a family of modified poly(aspartic acid) polymers is provided that are biodegradable like poly(aspartic acid) but which exhibit improved corrosion resistance and scale-formation inhibition.

DETAILED DESCRIPTION OF THE PRESENTLY PREFERRED EMBODIMENTS

The present invention provides an improved corrosion and scale inhibiting composition that is environmentally friendly. In a preferred embodiment, the corrosion and scale inhibiting composition of the present invention comprises a modified poly(aspartic acid) polymer which, in turn, comprises aspartic acid mer units and modified aspartic acid mer units. Examples of the modified aspartic acid mer units have sidechains selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

In a preferred embodiment, the aspartic acid mer units have the formula

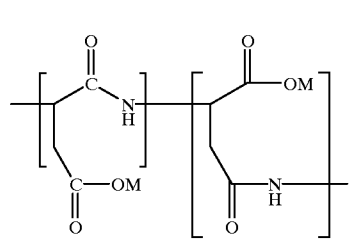

(I)

wherein M is a cation selected from the group consisting of hydrogen, an alkali metal, an alkaline earth metal, ammonium and alkyl-substituted ammonium cations.

In a preferred embodiment, the modified aspartic acid mer units have the formula

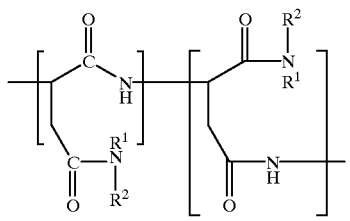

(II)

wherein $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

In a preferred embodiment, the composition of the present invention has the formula

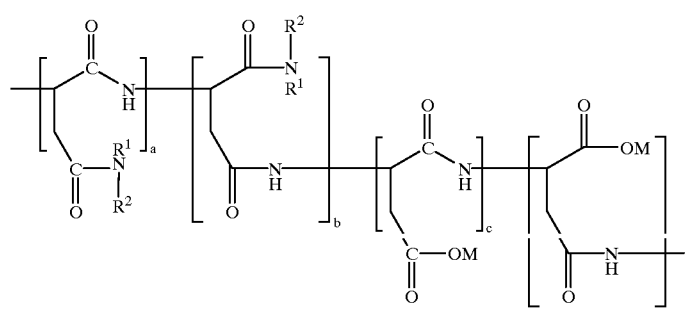

(III)

wherein M is a cation selected from the group consisting of hydrogen, an alkali metal, an alkaline earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion; and wherein $(a+b)/(c+d)$ ranges from about 0.05 to about 4.

Preferably, the molecular weight of the polymer of the present invention ranges from about 1000 to about 200,000. More preferably, the molecular weight is about 10,000. While the ratio $(a+b)/(c+d)$ can range from about 0.05 to about 4, a preferred ratio $(a+b)/(c+d)$ is 0.05 to 0.80, preferably 0.05 to 0.50, more preferably 0.05 to 0.30. A particularly preferred embodiment includes this ratio where $R^2$ is ethanol, thereby resulting in an ethanol amine sidechain.

EXAMPLES

The effectiveness of the modified poly(aspartic acid) polymers of the present invention is illustrated in FIGS. 1–4 and the tables that follow. Specifically, numerous tests were conducted comparing polymers 1–12, made in accordance with the present invention, as set forth in Table 1 with the polyaspartic acid polymers 13 and 14 and the imidazolium compound labeled number 15 in Table 2. Table 1. Biodegradable, modified aspartic acid polymers.

TABLE 1

Biodegradable, modified aspartic acid polymers.

| Polymer No. | R1 | R2 | Composition (a + b)/(c + d) | Weight average molecular weight |
|---|---|---|---|---|
| 1 | H | CH2CH2OH | 50/50 | 15000 |
| 2 | H | CH2CH2OH | 20/80 | 16500 |
| 3 | H | CH2CH2OH | 10/90 | 18000 |
| 4 | H | CH2CH2OH | 40/60 | 8300 |
| 5 | H | CH2CH2OH | 30/70 | 10000 |
| 6 | H | CH2CH2OH | 80/20 | 13000 |
| 7 | H | CH2CH2OH | 7/93 | 7100 |
| 8 | H | CH2CH2OCH2CH2OH | 20/80 | 50000 |
| 9 | H | CH2CH2NHCH2CH2OH | 40/60 | 3000 |
| 10 | H | CH2CH2CH2OCH3 | 20/80 | 48500 |
| 11 | H | OH | 24/76 | 6900 |
| 12 | H | CH2PO3M2 | 5/95 | 25000 |

TABLE 2

Polyaspartic acid and benchmark products.

| Product No. | Composition | Weight average molecular weight |
|---|---|---|
| 13 | polyaspartic acid | 20000 |
| 14 | polyaspartic acid | 10000 |
| 15 | imidazolium compound plus additives | — |

Corrosion performance of the modified poly(aspartic acid) polymers of Table 1 and Table 2 was assessed in stirred kettle tests simulating oil field conditions. The stirred kettle tests, also known as bubble tests, were conducted with a test fluid contained in a 1-liter glass cell. The test fluid consisted of 80 ml of ARCOPAK 90 (hydrogenated like oil) and 720 ml of 5% (w/w) of NaCl solution. The cell was constantly sparged with $CO_2$. The test temperature was 150° F. and the solution was agitated by an overhead stirrer at a constant rate of 150 rpm.

A 2-electrode LPR probe was used to monitor the corrosion rate. The electrodes were prepared by sandblasting them with 60–80 mesh blast beads followed by IPA rinse in an ultrasonic vat. After the baseline corrosion rate was established over a period of 2–5 hours, the corrosion inhibitor was added incrementally to the test cell. The corrosion rate was measured every 3 to 10 minutes. In order to compare the performance on an equal basis, the corrosion inhibitor dosage was based on the active polymer concentration.

Figure 2:
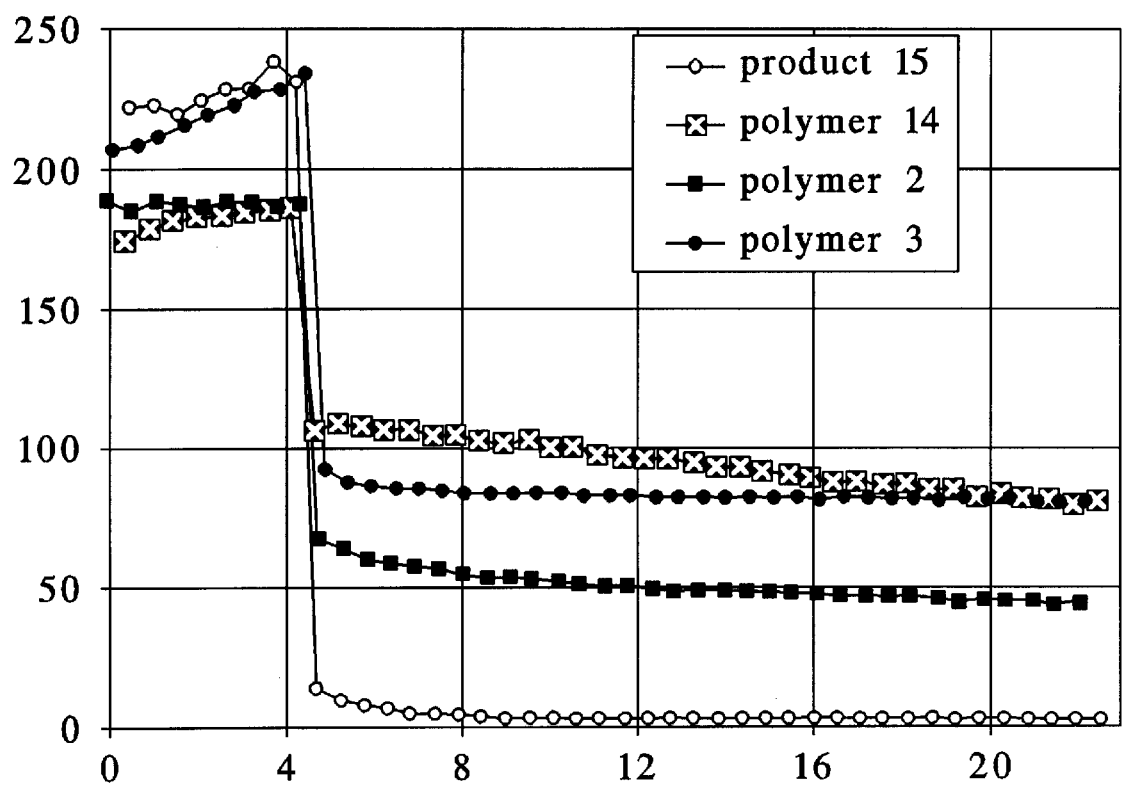
FIG. 2 illustrates, graphically, the reduced corrosion rate provided by polymers made in accordance with the present invention as opposed to polyaspartic acid polymers.

As illustrated in FIG. 1, the modified polyaspartic acid polymers made in accordance with the present invention, specifically polymers 1 and 11, provide superior corrosion inhibition as compared to the polyaspartic-acid polymers 13 and 14. While the imidazolium compound (Product No. 15) provides better corrosion inhibition than the modified polyaspartic acid polymers numbered 1 and 11, the imidazolium compound is not as biodegradable as the modified poly(aspartic acid)polymers of the present invention and is more expensive. FIG. 2 illustrates, graphically, the superiority of the modified poly(aspartic acid) polymers of the present invention, numbered 2 and 3, in comparison to the unmodified polyaspartic acid polymer numbered 14.

Figure 3:
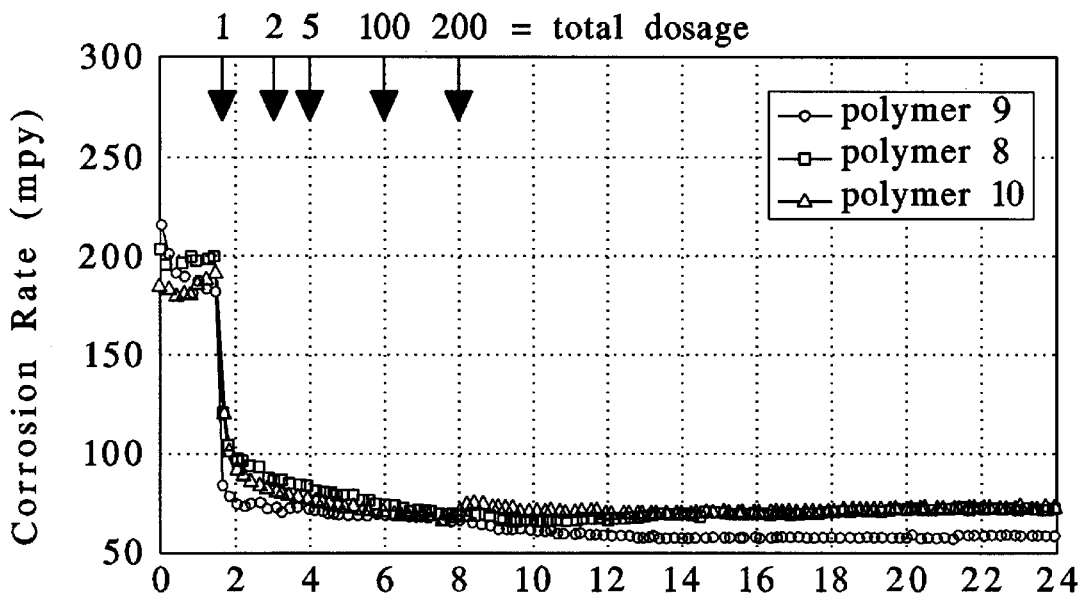
FIG. 3 illustrates, graphically, the corrosion rate provided by polymers made in accordance with the present invention.
Figure 4:
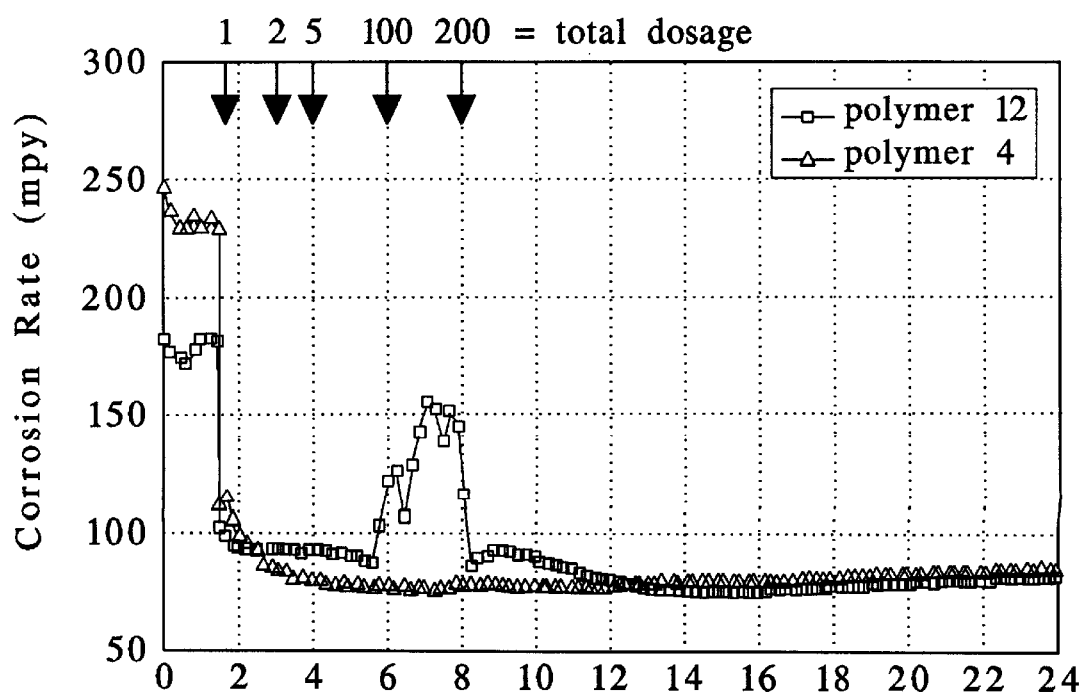
FIG. 4 illustrates, graphically, the corrosion rate provided by polymers made in accordance with the present invention.

FIG. 3 illustrates, graphically, the superior performance of the modified poly(aspartic acid) polymers made in accordance with the present invention and numbered 8, 9 and 10 in dosages greater than 1 ppm. FIG. 4 also illustrates, graphically, the superior performance provided by the modified poly(aspartic acid) polymers numbered 4 and 12 when the dosage exceeds 1 ppm.

Tables 4 and 5 illustrate the superior effectiveness of polymers made in accordance with the present invention at preventing barium sulfate scale formation and calcium carbonate scale formation respectively.

TABLE 3

Barium Sulfate Scale Inhibition Test Results

| | Inhibitor Dose, ppm | | | | | | |
|---|---|---|---|---|---|---|---|
| Polymer No. | 1 | 2 | 3 | 5 | 10 | 15 | 20 |
| polymer 1 | | | | | 39 | 60 | 75 | 82 |
| polymer 2 | | | | | 88 | 94 | 98 | 95 |
| polymer 7 | | | | | 84 | 90 | 91 | 92 |
| product 16 | | | 45 | 82 | 97 | | |
| polymer 13 | | | | | 97 | 98 | 98 | 99 |
| polymer 14 | | | | | 98 | 99 | 92 | 99 |

TABLE 4

Calcium Carbonate Scale Inhibition Test Results (NACE Method)

| | Inhibitor Dose, ppm | | | | | | |
|---|---|---|---|---|---|---|---|
| Polymer No. | 1 | 2 | 3 | 5 | 10 | 15 | 20 |
| polymer 1 | | | | | | | 69 |
| polymer 2 | | | | | 69 | 97 | 100 |
| polymer 7 | | | | | 86 | 97 | 100 |
| product 16 | | | 25 | 91 | 100 | | |
| polymer 13 | | | | | 56 | 100 | 100 |
| polymer 14 | | | | | 56 | 97 | 100 |

The scale inhibition tests set forth above in Tables 3 and 4 were carried out as follows. First, inhibitor solutions are prepared by diluting the inhibitor of interest in deionized water. Then, three separate brines are prepared: a brine X is prepared by dissolving 42 grams of sea salt in one liter of deionized water; and a brine Y is prepared by dissolving 25 grams of analytical grade sodium chloride and 0.0456 grams of analytical grade barium chloride dihydrate in distilled water to give a total volume of 1 liter; a brine Z is prepared by making a one liter solution of 50 grams of analytical grade sodium bicarbonate in deionized water. Brine Z is saturated for 15 minutes with carbon dioxide. The inhibitor to be tested is added to a 4-ounce sample bottle. 78 ml of brine Y is added to the 4-ounce bottle. 20 ml of brine X is added to the bottle and 2 ml of brine Z is added to the bottle. The bottle is capped and shaken and allowed to stand for 24 hours at room temperature. The sample is filtered through a 0.45 micron millipore filter. The barium concentration is determined by ICP. The samples are generally analyzed within hours of filtering. The results are set forth above in Table 4.

The calcium carbonate scale inhibition test was carried out in accordance with NACE standard TMO374-90, item number 53023 (1990). Essentially, equal parts of a bicarbonate-containing brine and a calcium-containing brine were added to the test cell. The test cell was capped and agitated and heated to 160° F. (71° C.). The test cells were placed in a forced draft oven or immersed in a hot water bath at 160° F. (71° C.) for 24 hours. The test cells were then removed and allowed to cool to 77° F. (25° C.) +/− 9° F. (5° C.) for a time period not to exceed 2 hours.

1 ml of the test brine was transferred to a suitable vessel, avoiding the transfer of calcium carbonate crystals. The brine was diluted with water and the calcium ion concentration procedures given in ASTM D 511-88 or D 1126-86, API RP 45, "Standard methods for the examination of water and wastewater (part 300)," or another accepted test method.

It will be noted that the inhibition of barium sulfate and calcium carbonate scale formation is determined using Equation 1 below:

$$\% \text{ inhibition} = \frac{[\text{filtered-blank}]}{[\text{initial-blank}]} \quad \text{(Equation 1)}$$

where, filtered=concentration of phosphate ion in filtrate in the presence of the inhibitor of the present invention after four hours;

initial=concentration of phosphate ion in the test solution at time zero; and blank=concentration of phosphate ion in the filtrate in the absence of any inhibitor after four hours.

Synthetic Procedures

To synthesize the polymers set forth in Table 1 the following general scheme is followed:

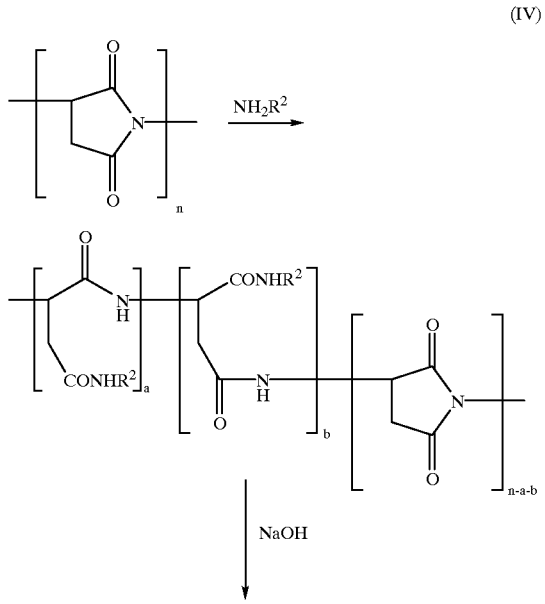

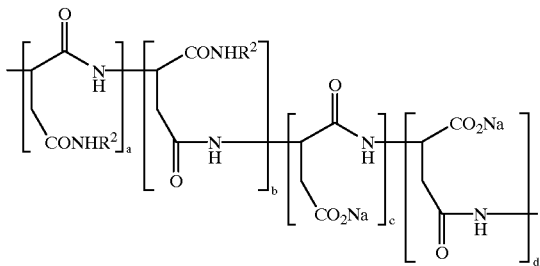

where $R^2$ is OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

For the polymers numbered 1–7 in Table 1, a magnetically stirred suspension of polysuccinimide (2.5 g; 0.025 mol) in deionized water (20.4 g). Ethanolamine (1.53 g/0.025 mol 1.0 equivalent) in deionized water (20.3 g) was added over a period of 17 minutes. The suspension was stirred at room temperature for 28 hours. Almost all of the solids disappeared within 50 minutes to form a clear solution. The pH was then adjusted with sodium hydroxide to arrange from 8.7 to 9.4 to afford crude EA-poly(asp). The concentrated solution was acidified to a pH of 1.5 precipitated with 100 ml of 1:1 ethanol/acetone. The supernatant was decanted. The precipitate was redissolved in a small amount of deionized water and dialyzed with a membrane (MWCO 12 to 14 K) for 33 hours. Dialyzed solution was then concentrated to afford pure EA-poly(asp).

In contrast, in preparing polymer number 11 (Ha-poly (asp)) as set forth in Table 1, 20 g of deionized water and 50% sodium hydroxide was added to hydroxylamine hydrochloride to give a clear solution. The solution was added over 1–2 minutes to a suspension of polysuccinimide in deionized water. The suspension was magnetically stirred at room temperature for an extended period of time, e.g. 34 hours. The pH was then adjusted from about 5.9 to about 9.0 and the solution was stirred for approximately 2.3 hours. The pH was adjusted again to a range from about 8.7 to about 7.7 to afford a crude product. The crude product was dialyzed against deionized water (membrane MWCO 1000) for 48 hours to remove unreacted hydroxylamine to give a pure product.

In preparing the polymer number 12 in Table 1, (AMPA-poly(asp)), to a stirred suspension of AMPA in deionized water, a sodium hydroxide solution was added. The resulting solution was then added over 1 minute to a magnetically stirred suspension of polysuccinimide in deionized water. The resulting suspension was then stirred at room temperature for about 7 hours with a resulting pH of about 8.2. Additional sodium hydroxide was then added to form a clear solution. Dialysis was carried out to afford a pure polymer.

In preparing the polymer numbered 8 in Table 1 (poly (ASP/AEE)), a solution of polysuccinimide and water was prepared and to the solution, a solution of 8.29 g aminoethoxyethanol in 5 g of deionized water was added. The pH adjustments and dialysis steps were carried out similar to those set forth above.

In preparing the polymers numbered 9 in Table 1 (poly (ASP/AEE)), a solution of 5.31 grams of aminoethylaminoethanol and 5 grams of deionized water was slowly added to a solution of 10 grams of polysuccinimide and 51.65 grams of deionized water. The resulting pH was 4.75 which was subsequently adjusted as set forth generally above.

In preparing the polymer numbered 10 in Table 1 (poly (ASP/MOPA)), a solution of polysuccinimide (15.00 g) and 50 grams of deionized water was prepared and to it was added a solution of 6.95 grams of MOPA ($NH_2CH_2CH_2CH_2OCH_3$) and 5 grams of deionized water was added. 5% of sodium hydroxide was subsequently added to adjust the pH. The resulting product was filtered through a 100 mesh screen.

Biodegradability

Although the homopolymer of 2-hydroxyethylaspartamide or 2-hydroxyethylglutamide are not biodegradable as previously disclosed, the modified aspartic acid polymers were found in this invention to be biodegradable. The biodegradability of the ethanolamine modified aspartic acid polymers ($R^1$=H $R^2$ $CH_2CH_2OH$ in Formula I) increases with the molar ratio of $(a+b)/(a+b+c+d)$ decreases. The copolymers with molar ratio of $(a+b)/(a+b+c+d) \leq 30/70$ are readily and completely biodegradable.

Based on the OECD Guidelines for Testing of Chemical, a $CO_2$ evolution test appoints a limit of 60% of theoretical evolution of carbon dioxide for proving ready biodegradation. The rest of organic carbon may be incorporated into specific formation of biomass and new metabolic side products. In fact, $^{13}C$ NMR study on the concentrated final test suspension from the vessel containing 30/70 EA/ASP copolymer (polymer 5, Table 1) and inoculum indicated that no residual of the copolymer existed in the test suspension, suggesting the copolymer was completely biodegraded. The test results summarized in Table 5 and in Table 6 indicate that the biodegradability of EA/ASP copolymers increases as the EA/ASP mole ratio decreases. Ready and complete biodegradation can be achieved by controlling the copolymer EA/ASP mole ratio to equal or less than 30/70. The biodegradability of other copolymers could be similarly controlled.

TABLE 5

Inherent Biodegradation Test Conditions and Results.

| Test Substance & Concentration (mg DOC/l) | Sludge concentration (mg/l) | Percent DOC Loss (Day) | | | | | | |
|---|---|---|---|---|---|---|---|---|
| | | 4 | 11 | 14 | 19 | 25 | 28 | 36 |
| 50/50 EA/ASP (polymer 1), 200 | 1000 | 9.2 | 14.4 | 17.7 | 22.0 | 27.7 | 27.8 | 29.6 |
| 30/70 EA/ASP (polymer 5), 45 | 1000 | 11.1 | 44.9 | 52.4 | 70.7 | 87.1 | 89.1 | 91.1 |
| 80/20 EA/ASP (polymer 6), 200 | 1000 | 6.3 | 7.9 | 9.1 | 9.8 | 16.2 | 18.1 | 21.5 |
| Ethylene glycol, 200 | 1000 | 100 | 100 | 100 | 100 | 100 | | |

TABLE 5-continued

Inherent Biodegradation Test Conditions and Results.

| Test Substance & Concentration (mg DOC/l) | Sludge concentration (mg/l) | Percent DOC Loss (Day) | | | | | | |
|---|---|---|---|---|---|---|---|---|
| | | 4 | 11 | 14 | 19 | 25 | 28 | 36 |
| Ethylene glycol, 200 50/50 EA/ASP (polymer 1), 200 | 1000 | 111.5 | 114.5 | 117.0 | 128.7 | 135.9 | 135.1 | 137.4 |

The total DOC loss % = Total DOC loss/Initial DOC/ethylene glycol × 100%. Thus, the DOC loss % of the 50/50 EA/ASP = Total DOC loss-DOC loss % from ethylene glycol.

TABLE 6

Ultimate Biodegradation Test Conditions and Results.

| Test Substance & Concentration (mg DOC/l) | mg sludge/l | % ThCO$_2$ Produced (Day) | | | | | | |
|---|---|---|---|---|---|---|---|---|
| | | 5 | 12 | 15 | 20 | 24 | 28 | 35 |
| 30/70 EA/ASP (polymer 5), 15 | 30 | 0 | 22.2 | 42.5 | 53.1 | 59.4 | 64.2 | 73.4 |
| 50/50 EA/ASP (polymer 1), 15 | 30 | 1.8 | 9.1 | 11.0 | 13.1 | 19.2 | 21.3 | 24.3 |
| Sodium acetate, 15 | 30 | 60.0 | 77.4 | 79.0 | 81.4 | 84.8 | 85.9 | 85.9 |
| 2-hydroxyethylamine, 15 | 30 | 54.0 | 70.4 | 74.7 | 76.3 | 80.2 | 82.1 | 82.1 |

HEA/ASP copolymer: L-2-hydroxyethylaspartamide/aspartic acid copolymer.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed:

1. A biodegradable composition for reducing corrosion on metallic surfaces, the composition comprising:
   a modified poly(aspartic acid) polymer comprising aspartic acid mer units and modified aspartic acid mer units, the modified aspartic acid mer units having sidechains selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

2. The composition of claim 1 wherein the composition also inhibits scale formation on metallic surfaces.

3. The composition of claim 1 wherein the aspartic acid mer units have the formula

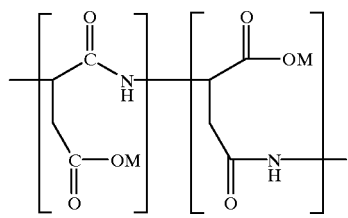

(I)

wherein M is a cation selected from the group consisting of hydrogen, an alkali metal, an alkaline earth metal, ammonium and alkyl-substituted ammonium cations.

4. The composition of claim 1 wherein the polymer has molecular weight ranging from about 1000 to about 200,000.

5. The composition of claim 1 wherein the modified aspartic acid mer units have the formula

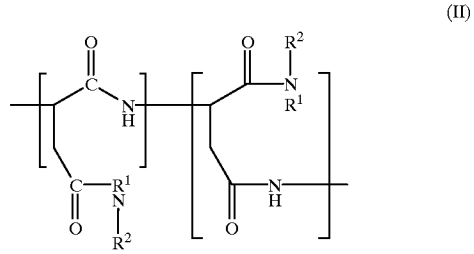

(II)

wherein $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion.

6. The composition of claim 5 wherein $R^2$ is ethanol.

7. The composition of claim 5 wherein $R^2$ is ethoxyethanol.

8. The composition of claim 5 wherein $R^2$ is methoxypropyl.

9. The composition of claim 5 wherein $R^2$ is OH.

10. The composition of claim 5 wherein $R^2$ is ethylaminoethanol.

11. The composition of claim 1 wherein the composition has the formula

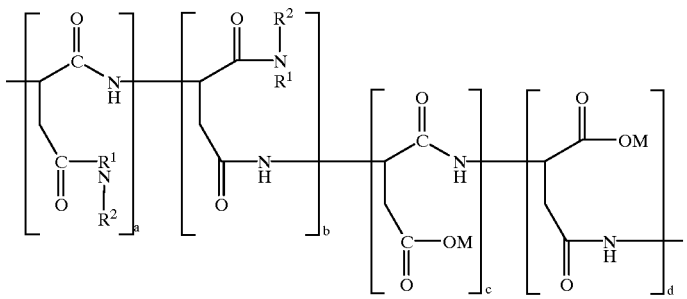

wherein M is a cation selected from the group consisting of hydrogen, an alkali metal, an alkaline earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion, and wherein (a+b)/(c+d) ranges from about 0.05 to about 4.

12. The composition of claim 11 wherein (a+b)/(c+d) ranges from 0.05 to 0.80.

13. A biodegradable composition for reducing corrosion and inhibiting scale formation on metallic surfaces of oilfield equipment, the composition comprising:

a modified poly(aspartic acid) polymer having the formula

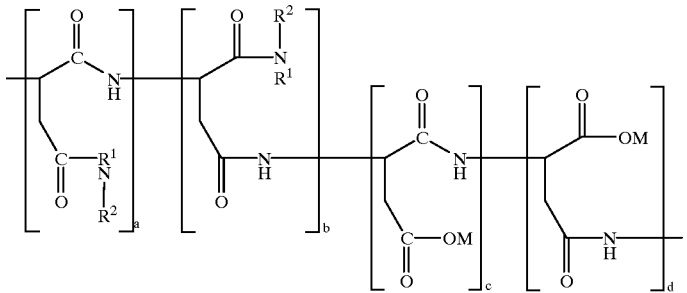

wherein M is a cation selected from the group consisting of hydrogen, an alkali metal, an alkaline earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion; and wherein (a+b)/(c+d) ranges from about 0.05 to about 4.

14. The composition of claim 13 wherein the polymer has molecular weight ranging from about 1000 to about 200,000.

15. The composition of claim 13 wherein $R^2$ is ethanol.

16. The composition of claim 13 wherein $R^2$ is ethoxyethanol.

17. The composition of claim 13 wherein $R^2$ is methoxypropyl.

18. The composition of claim 13 wherein $R^2$ is OH.

19. The composition of claim 13 wherein $R^2$ is ethylaminoethanol.

20. The composition of claim 13 wherein (a+b)/(c+d) ranges from 0.05 to 0.80.

21. A method of reducing corrosion and inhibiting scale formation in a system for circulating fluid in an oil for gas well, the method comprising the following steps:
adding a composition to the fluid being circulated in the system, the composition comprising
a modified poly(aspartic acid) polymer having the formula (III)

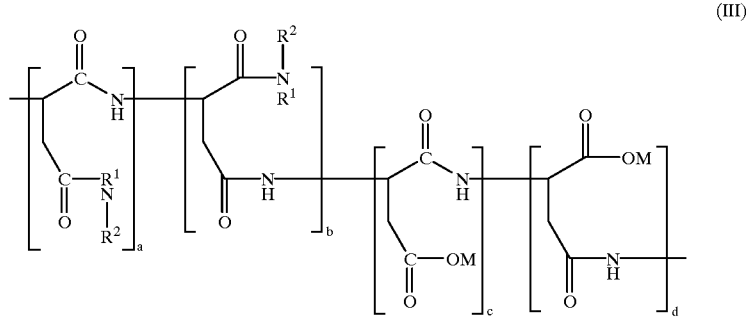

wherein M is a cation selected from the group consisting of hydrogen, an alkali metal, an alkaline earth metal, ammonium and alkyl-substituted ammonium cations; $R^1$ comprises hydrogen; and $R^2$ is selected from the group consisting of OH, $CH_2CH_2OH$, $CH_2CH_2OCH_2CH_2OH$, $CH_2CH_2NHCH_2CH_2OH$, $CH_2CH_2CH_2OCH_3$ and $CH_2PO_3M^1$ wherein $M^1$ is a metal ion; and wherein $(a+b)/(c+d)$ ranges from about 0.05 to about 4.

22. The method of claim 21 wherein the adding step comprises adding said composition in an amount so that a concentration of the composition in the fluid exceeds 1 ppm.

23. The method of claim 21 wherein $(a+b)/(c+d)$ ranges from 0.05 to 0.80 and wherein $R^2$ is ethanol.

* * * * *